(12) United States Patent
Ano

(10) Patent No.: US 11,249,594 B2
(45) Date of Patent: Feb. 15, 2022

(54) PROJECTOR INCLUDING A LIGHT DETECTOR AND A CONTROLLER AND METHOD FOR CONTROLLING THE PROJECTOR

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/036,585

(22) Filed: Sep. 29, 2020

(65) Prior Publication Data

US 2021/0096687 A1 Apr. 1, 2021

(30) Foreign Application Priority Data

Sep. 30, 2019 (JP) .............................. JP2019-178865

(51) Int. Cl.
*G06F 3/041* (2006.01)
*G06F 3/0488* (2013.01)
*G06F 3/042* (2006.01)
*G02B 5/09* (2006.01)

(52) U.S. Cl.
CPC ............. *G06F 3/0418* (2013.01); *G02B 5/09* (2013.01); *G06F 3/0421* (2013.01); *G06F 3/0488* (2013.01)

(58) Field of Classification Search
CPC .... G06F 3/0418; G06F 3/0488; G06F 3/0421; G02B 5/09
See application file for complete search history.

(56) References Cited

U.S. PATENT DOCUMENTS

| | | | |
|---|---|---|---|
| 9,024,897 B2 | 5/2015 | Tanaka | |
| 9,639,165 B2 | 5/2017 | Naess et al. | |
| 9,715,285 B2* | 7/2017 | Koyama | G01S 7/497 |
| 9,753,192 B2* | 9/2017 | Furukawa | G06F 3/0428 |
| 2010/0253860 A1* | 10/2010 | Nishigaki | H04N 9/3147 348/744 |
| 2011/0058109 A1* | 3/2011 | Nishigaki | H04N 9/3129 348/744 |

(Continued)

FOREIGN PATENT DOCUMENTS

| | | |
|---|---|---|
| JP | 2013-191109 A | 9/2013 |
| JP | 5641003 B2 | 12/2014 |

(Continued)

*Primary Examiner* — David D Davis
(74) *Attorney, Agent, or Firm* — Oliff PLC

(57) ABSTRACT

A projector can include a projection section that projects an image on a projection surface, a detection light radiation section that radiates detection light in a direction corresponding to the projection surface. The projector can also include an adjuster that adjusts the direction of the detection light relative to the projection surface, and an imager and a controller that can detect reflected light resulting from the detection light to detect operation performed on the projection surface. The controller can evaluate whether or not the detection state of the reflected light corresponds to a specific state. If the detection is in the specific state, the adjuster can adjust the direction of the detection light based on a result of the evaluation.

16 Claims, 9 Drawing Sheets

(56) References Cited

U.S. PATENT DOCUMENTS

| | | | | |
|---|---|---|---|---|
| 2015/0204659 A1* | 7/2015 | Furukawa | ............ | G06F 3/0428 |
| | | | | 362/297 |
| 2016/0124527 A1* | 5/2016 | Smutek | ................ | G06F 3/0386 |
| | | | | 345/175 |
| 2017/0264874 A1* | 9/2017 | Ono | ..................... | H04N 9/3188 |
| 2018/0278900 A1* | 9/2018 | Wakimoto | ............ | G06F 3/0418 |
| 2019/0302594 A1 | 10/2019 | Higashi | | |
| 2019/0306478 A1* | 10/2019 | Tamura | ................ | H04N 9/3194 |

FOREIGN PATENT DOCUMENTS

| | | | |
|---|---|---|---|
| JP | 2015-158653 A | 9/2015 |
| JP | 2015-158887 A | 9/2015 |
| JP | 2017-129767 A | 7/2017 |
| JP | 2019-174513 A | 10/2019 |

\* cited by examiner

PROJECTOR INCLUDING A LIGHT DETECTOR AND A CONTROLLER AND METHOD FOR CONTROLLING THE PROJECTOR

The present application is based on, and claims priority from JP Application Serial Number 2019-178865, filed Sep. 30, 2019, the disclosure of which is hereby incorporated by reference herein in its entirety.

BACKGROUND

1. Technical Field

The present disclosure relates to a projector and a method for controlling the projector.

2. Related Art

There has been a known projector that radiates detection light and detects operation of a pointing element performed on a projection surface. In such a projector that detects the operation of the pointing element, a technology for improving the accuracy of the detection of the operation has been proposed. JP-A-2013-191109 discloses an operation input apparatus that includes a touch panel that detects operation of a pointing element, detects that a user's hand has moved to a position in the vicinity of the frame of the touch panel, and changes a touch detection region at the timing when the movement of the user's hand to a position in the vicinity of the frame is detected.

The projector that detects operation of the pointing element by using detection light falsely detects the operation of the pointing element in some cases if the radiation direction of the detection light has not been adjusted to a direction suitable for the projection surface.

SUMMARY

An aspect is directed to a projector including a projection section that projects an image on a projection surface, a detection light radiation section that radiates detection light in a direction corresponding to the projection surface, an adjuster that adjusts the direction of the detection light with respect to the projection surface; a detector that detects reflected light resulting from the detection light to detect operation performed on the projection surface; and a controller that evaluates whether or not a state of the detection of the reflected light corresponds to a specific state and causes the adjuster to adjust the direction of the detection light based on a result of the evaluation.

In the projector described above, the detection light radiation section may radiate the detection light in a direction along the projection surface. The detector may detect the reflected light reflected off a pointing element in contact with or in the vicinity of the projection surface. When the controller determines that the state of the detection of the reflected light corresponds to the specific state, the controller may control the adjuster to adjust an angle between the projection surface and the detection light.

In the projector described above, when the controller determines that the state of the detection of the reflected light corresponds to the specific state even after the angle between the projection surface and the detection light is adjusted, the controller may adjust an image projection range on the projection surface.

In the projector described above, when the controller determines that the state of the detection of the reflected light corresponds to the specific state even after the image projection range on the projection surface is adjusted, the controller may edit an image to be projected on the projection surface.

In the projector described above, the controller may adjust at least one of a position and a size of the projection range to adjust the projection range.

In the projector described above, when the controller determines that the state of the detection of the reflected light corresponds to the specific state, the controller may evaluate whether or not the direction of the detection light with respect to the projection surface is adjustable, and when the controller determines that the direction of the detection light is not adjustable, the controller may adjust an image projection range on the projection surface.

In the projector described above, when the controller determines that the state of the detection of the reflected light corresponds to the specific state, the controller may evaluate whether or not the direction of the detection light with respect to the projection surface is adjustable, and when the controller determines that the direction of the detection light is not adjustable, the controller may adjust at least one of a position and a size of an image projection range on the projection surface.

In the projector described above, when the controller determines that the direction of the detection light is not adjustable, the controller may edit an image to be projected on the projection surface.

Another aspect is directed to a method for controlling a projector, the method including radiating detection light in a direction corresponding to a projection surface onto which an image is projected, detecting reflected light resulting from the detection light to detect operation performed on the projection surface, evaluating whether or not a state of the detection of the reflected light corresponds to a specific state, and adjusting the direction of the detection light with respect to the projection surface based on a result of the evaluation.

In the method for controlling a projector described above, the detection light may be radiated in a direction along the projection surface. The reflected light reflected off a pointing element in contact with or in the vicinity of the projection surface may be detected. When it is determined that the state of the detection of the reflected light corresponds to the specific state, an angle between the projection surface and the detection light may be adjusted.

In the method for controlling a projector described above, when it is determined that the state of the detection of the reflected light corresponds to the specific state even after the angle between the projection surface and the detection light is adjusted, an image projection range on the projection surface may be adjusted.

In the method for controlling a projector described above, when it is determined that the state of the detection of the reflected light corresponds to the specific state even after the image projection range on the projection surface is adjusted, an image to be projected on the projection surface may be edited.

In the method for controlling a projector described above, at least one of a position and a size of the projection range may be adjusted to adjust the projection range.

In the method for controlling a projector described above, when it is determined that the state of the detection of the reflected light corresponds to the specific state, it may be evaluated whether or not the direction of the detection light with respect to the projection surface is adjustable, and when it is determined that the direction of the detection light is not adjustable, an image projection range on the projection surface may be adjusted.

In the method for controlling a projector described above, when it is determined that the state of the detection of the reflected light corresponds to the specific state, it may be evaluated whether or not the direction of the detection light with respect to the projection surface is adjustable, and when it is determined that the direction of the detection light is not adjustable, at least one of a position and a size of an image projection range on the projection surface may be adjusted.

In the method for controlling a projector described above, when it is determined that the direction of the detection light is not adjustable, an image to be projected on the projection surface may be edited.

DESCRIPTION OF EXEMPLARY EMBODIMENTS

Figure 1:
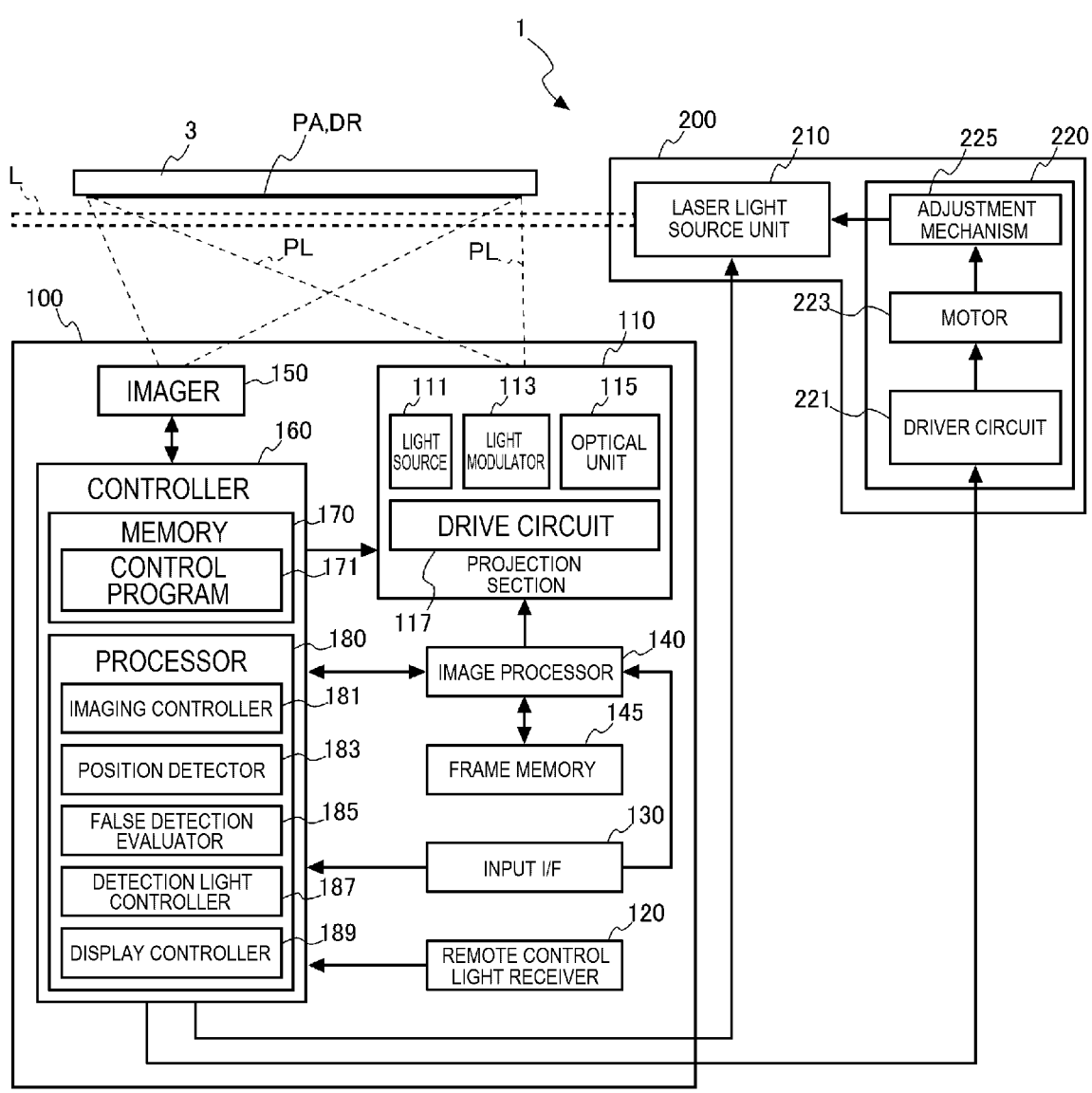
FIG. 1 shows the configuration of a projector.

An embodiment of the present disclosure will be described below with reference to the drawings. In the drawings, the dimension and scale of each portion differ from actual values. The embodiment described below is a preferable specific examples of the present disclosure. A variety of technically preferable restrictions are therefore imposed on the present embodiment described below. The scope of the present disclosure is, however, not limited to the forms of the portions unless the following description states that particular restrictions are imposed on the present disclosure.

FIG. 1 shows the configuration of a projector 1.

The projector 1 according to the present embodiment has an interactive function. The interactive function is the function of detecting the position of a pointing element operated on a projection surface and displaying an image corresponding to the position or the trajectory of the pointing element or changing the displayed image based on the result of the detection. A user's finger, a pen, a pointing rod, or any other object is used as the pointing element. In the following description, operation performed with the pointing element being in contact with a projection surface 3 or in the vicinity thereof is called touch operation.

The projector 1 includes an image projection section 100, which projects image light PL, and a detection light radiation section 200, which radiates detection light L, which is used to detect the touch operation, in a direction corresponding to the projection surface 3.

Figure 2:
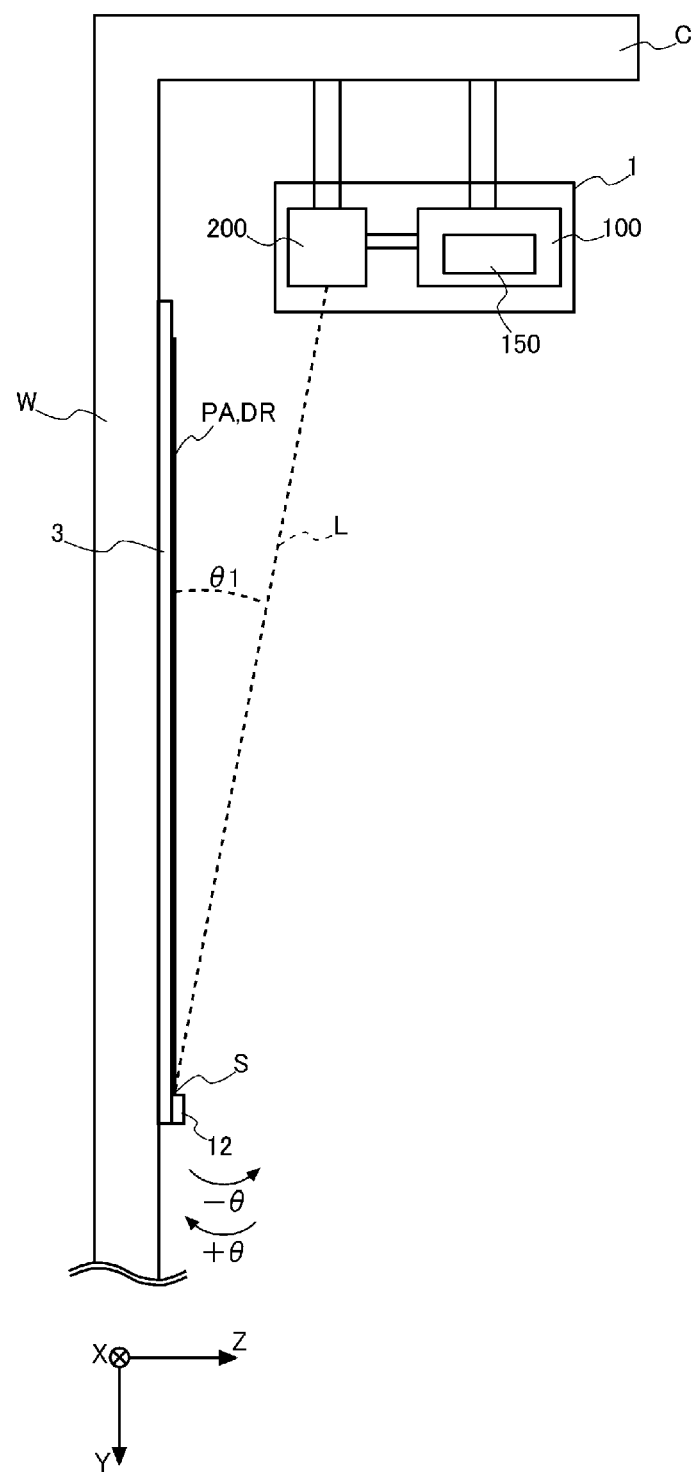
FIG. 2 is a side view showing a state of the installed projector.
Figure 3:
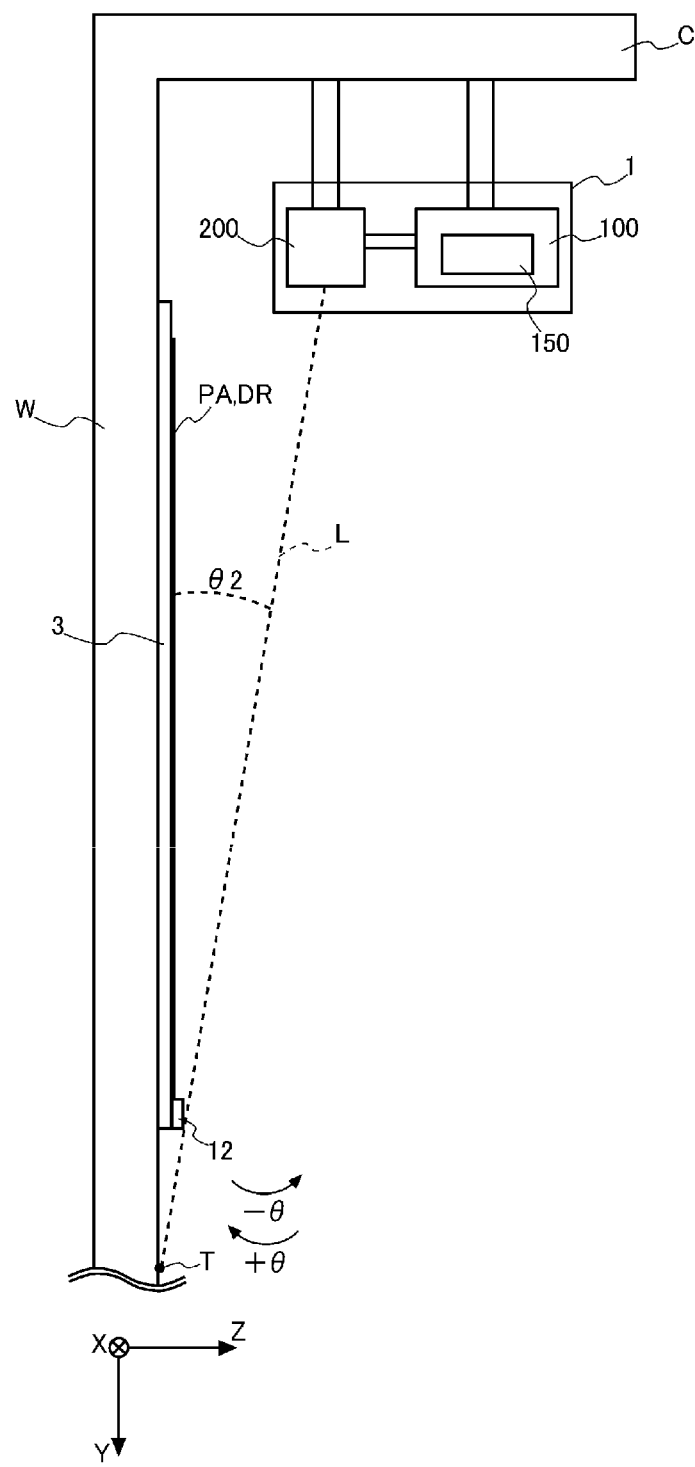
FIG. 3 is a side view showing another state of the installed projector.

The image projection section 100 and the detection light radiation section 200 are installed, for example, on the ceiling or a wall of a room. The image projection section 100 produces the image light PL based on image data and projects the produced image light PL toward the projection surface 3, which is located obliquely below the image projection section 100. FIGS. 2 and 3, which will be described later, show a case where the projection surface 3 is a screen, and a wall surface of a room, a whiteboard, a blackboard, or any other object can be used as the projection surface 3. A region of the projection surface 3 that is the region where the image projection section 100 projects the image light PL is called a projection region PA. The projection region PA corresponds to the "projection range" in the present disclosure. The image projection section 100 projects the image light PL in such a way that the projected image light PL falls within the projection surface 3.

The detection light radiation section 200 radiates the detection light L in the form of a layer or a curtain along the surface of the projection surface 3. The detection light L radiated by the detection light radiation section 200 covers the entire projection surface 3. Infrared light can, for example, be used as the detection light L. The phrase "in the form of a layer" or "in the form of a curtain" means that the detection light L has the shape of a thin space having a substantially uniform thickness.

FIG. 1 shows a case where the image projection section 100 and the detection light radiation section 200 are sections separate from each other, and the image projection section 100 and the detection light radiation section 200 may instead be accommodated in the enclosure of the projector 1 and integrated with each other.

The image projection section 100 includes a projection section 110, a remote control light receiver 120, an input interface 130, an image processor 140, a frame memory 145, an imager 150, and a controller 160. The interface is hereinafter referred to as an "I/F." The imager 150 along with an imaging controller 181 and a position detector 183, which will be described later, corresponds to an example of the "detector" in the present disclosure.

The projection section 110 includes a light source 111, a light modulator 113, an optical unit 115, and a drive circuit 117.

The light source 111 is formed of a lamp light source, such as a halogen lamp, a xenon lamp, and an ultrahigh-pressure mercury lamp. The light source 111 may instead be a solid-state light source, such as an LED (light emitting diode) and a laser light source.

The light modulator 113 includes a light modulation device that modulates the light emitted from the light source 111 to produce the image light PL. The light modulation device can, for example, be a transmissive liquid crystal light valve, a reflective liquid crystal light valve, or a digital mirror device.

The optical unit 115 includes optical elements, such as lenses and mirrors, enlarges the image light PL produced by the light modulator 113, and projects the enlarged image light PL on the projection surface 3. The user can visually recognize an image that is the image light PL focused on the projection surface 3.

The drive circuit 117 is a circuit that drives the light source 111, the light modulator 113, and the optical unit 115.

The drive circuit 117 controls operation of turning on or off the light source 111 in accordance with a control signal inputted from the controller 160. When the light modulation device is formed of a liquid crystal light valve, the drive circuit 117 functions as a driver circuit that drives the liquid crystal material. Specifically, the drive circuit 117 draws an image corresponding to image data inputted from the image processor 140 on a frame basis by using the liquid crystal material that forms the light modulation device. Further, the drive circuit 117 drives the lenses and mirrors in the optical unit 115 in accordance with a control signal inputted from the controller 160 to perform zooming and focusing adjustment.

The remote control light receiver 120 receives an infrared signal transmitted from a remote control that is not shown. The remote control light receiver 120 outputs an operation signal corresponding to the received infrared signal to the controller 160. The operation signal is a signal corresponding to an operated switch of the remote control.

The input I/F 130 is an interface for connection to an external apparatus. The input I/F 130 includes a connector that connects a cable to the external apparatus and an interface circuit that performs signal processing. The input I/F 130 receives an image signal supplied from the external apparatus coupled to the input I/F 130. The image signal contains image data and a sync signal. The input I/F 130 extracts the image data and the sync signal from the received image signal, outputs the extracted image data and sync signal to the image processor 140, and outputs the sync signal to the controller 160. The image processor 140 processes one frame of the image data in synchronization with the inputted sync signal and outputs the processed image data to the drive circuit 117. The controller 160 controls each portion of the projector 1 in synchronization with the inputted sync signal. One frame refers to the period for which an image corresponding to one screen is displayed. One frame of the image data is image data to be displayed in a vertical scan period specified by a vertical sync signal contained in the sync signal.

The image processor 140 develops the inputted image data in the frame memory 145. The frame memory 145 is formed, for example, of an SDRAM (synchronous dynamic random access memory).

The image processor 140 performs image processing on the image data developed in the frame memory 145. The image processing performed by the image processor 140 includes, for example, resolution conversion, resizing, distortion correction, shape correction, digital zooming, and image color tone and luminance adjustment. The image processor 140 carries out a process specified by the controller 160 and carries out the process by using a parameter inputted from the controller 160 as necessary. The image processor 140 can, of course, perform a plurality of types of the image processing described above in combination. The image processor 140 reads the image data from the frame memory 145 and outputs the read image data to the drive circuit 117.

The image processor 140 and the frame memory 145 are each formed, for example, of an integrated circuit. Examples of the integrated circuit include an LSI, an ASIC (application specific integrated circuit), a PLD (programmable logic device), an FPGA (field-programmable gate array), and SoC (system-on-a-chip). Part of the configuration of the integrated circuit may include an analog circuit, or the controller 160 and the integrated circuit may be combined with each other.

The imager 150 is a camera including, for example, a CCD (charge coupled device), a CMOS (complementary metal oxide semiconductor), or any other device that converts light collected via an optical system, such as a lens, into an electric signal. The imager 150 is disposed in a position where the imager 150 can capture reflected light that is the detection light L reflected off the pointing element with which the touch operation is performed. An infrared filter that receives the reflected detection light L is attached to the imager 150. The imager 150 is configured as hardware integrated with the image projection section 100. The imager 150 may not be integrated with the image projection section 100 but may communicate with the image projection section 100 over a wire or wirelessly.

The imager 150 captures an image of a range including the projection region PA of the projection surface 3. The imager 150 performs the imaging at a predetermined frame rate to generate captured images and outputs the generated captured images to the controller 160. When the touch operation is performed with the pointing element, the detection light L radiated by the detection light radiation section 200 and reflected off the pointing element is detected in the captured images.

The detection light radiation section 200 will next be described. The detection light radiation section 200 includes a laser light source unit 210 and an adjuster 220. The adjuster 220 includes a driver circuit 221, a motor 223, and an adjustment mechanism 225.

The laser light source unit 210 is a unit in which optical members, such as a collimator lens and a Powell lens, are attached to one or more LDs (laser diodes) and outputs the detection light L in the form of a layer or a curtain over the entire projection surface 3. The smaller the distance between the projection surface 3 and the detection light L, the higher the accuracy of detection of the position of the pointing element, but false detection of the pointing element occurs as the distance between the detection light L and the projection surface 3 decreases. The distance between the projection surface 3 and the detection light L is set, for example, at a value that falls within a range from 1 to 10 mm, more preferably, 1 to 5 mm.

The driver circuit 221 drives the motor 223. The motor 223 can, for example, be a stepper motor, which allows forward and reverse rotation. The motor 223 performs the forward or reverse rotation to operate the adjustment mechanism 225, which then adjusts the radiation angle of the detection light L radiated by the laser light source unit 210. The angle between the detection light L and the projection surface 3 is thus changed.

FIGS. 2 and 3 are side views showing states of the installed projector 1.

The image projection section 100 and the detection light radiation section 200 shown in FIGS. 2 and 3 by way of example are fixed to a ceiling C of a room, and the screen, which is the projection surface 3, is fixed to a wall W of the room. The image projection section 100 and the detection light radiation section 200 are installed in front of and above the projection surface 3. The image projection section 100 and the detection light radiation section 200 may instead be installed on the wall W. In the present embodiment, an axis-Z direction is the direction of a normal to the projection surface 3 that is a forward direction from the projection surface 3, an axis-Y direction is a downward direction along the projection surface 3, and an axis-X direction is the direction perpendicular to the axis-Z and axis-Y directions. FIGS. 2 and 3 show that the detection light radiation section 200 radiates the detection light L downward along the projection surface 3 at a predetermined angle with respect thereto. FIGS. 2 and 3 differ from each other in terms of the radiation angle of the detection light L radiated by the detection light radiation section 200. FIG. 2 shows a case where the angle between the detection light L and the projection surface 3 is $\theta 1$, and FIG. 3 shows a case where the angle between the detection light L and the projection surface 3 is $\theta 2$. The angle $\theta 1$ is greater than the angle $\theta 2$.

In FIGS. 2 and 3, the dimensions and scales of the projector 1 and the projection surface 3 greatly differ from actual values. The angles θ1 and 2 shown in FIGS. 2 and 3 are therefore exaggerated as compared with actual values.

When the angle between the detection light L and the projection surface 3 is θ1, a lower end S of the projection surface 3 shown in FIG. 2 is irradiated with the detection light L radiated by the detection light radiation section 200. In this state, when the motor 223 performs the reverse rotation, the radiation angle of the detection light Lis so changed that the distance between the detection light L and the projection surface 3 increases. That is, when the motor 223 performs the reverse rotation, the angle between the detection light L and the projection surface 3 is changed to θ2.

When the angle between the detection light L and the projection surface 3 is θ2, a position T on the wall surface on which the projector 1 is installed, which is a position beyond the projection surface 3, is irradiated with the detection light L radiated by the detection light radiation section 200. In this state, when the motor 223 performs the forward rotation, the radiation angle of the detection light L is so changed that the distance between the detection light L and the projection surface 3 decreases. That is, when the motor 223 performs the forward rotation, the angle between the detection light L and the projection surface 3 is changed to θ1. Changing the radiation angle of the detection light L changes the radiation range of the detection light L and further changes the touch operation detectable range.

The controller 160 is a computer apparatus including a memory 170 and a processor 180. The memory 170 includes a volatile storage, such as a RAM (random access memory), and a nonvolatile storage, such as a ROM (read only memory) and a flash memory. The memory 170 stores a control program 171 executed by the processor 180. The control program 171 includes, for example, firmware.

The processor 180 is a computation apparatus formed of a CPU (central processing unit) or an MPU (micro processing unit). The processor 180 executes the control program 171 to control each portion of the image projection section 100. The processor 180 may be formed of a single processor or a plurality of processors. The processor 180 may instead be formed of an SoC (system on chip) integrated with part or entirety of the memory 170 and other circuits. The processor 180 may still instead be formed of the combination of a CPU that executes a program and a DSP (digital signal processor) that performs predetermined computation. Still instead, the processor 180 may be formed of hardware that implements the entire functions of the processor 180 or may be configured by using a programmable device.

The controller 160 includes an imaging controller 181, a position detector 183, a false detection evaluator 185, a detection light controller 187, and a display controller 189 as functional blocks. The functions achieved when the processor 180 executes instruction sets written in the control program 171 to perform data computation and control are expressed in the form of the functional blocks for convenience. The imaging controller 181 and the position detector 183 along with the imager 150 correspond to an example of the "detector" in the present disclosure.

The imaging controller 181 causes the imager 150 to perform the imaging. The imager 150 captures images of the range including the projection surface 3 at the preset frame rate to generate captured images. The imager 150 outputs the generated captured images to the controller 160. The imaging controller 181 causes the memory 170 to store the captured images inputted from the imager 150.

The position detector 183 reads the captured images and detects images of the infrared light from the read captured images to detect the position at which the pointing element is pointing. The images of the infrared light are each an image of the reflected light that is the detection light L reflected off the pointing element. The position detector 183 determines, out of the detected images of the infrared light, an image having a size that falls within a preset range as an image of the infrared light. The position detector 183 determines an image smaller or larger than the sizes within the preset range as noise.

Figure 6:
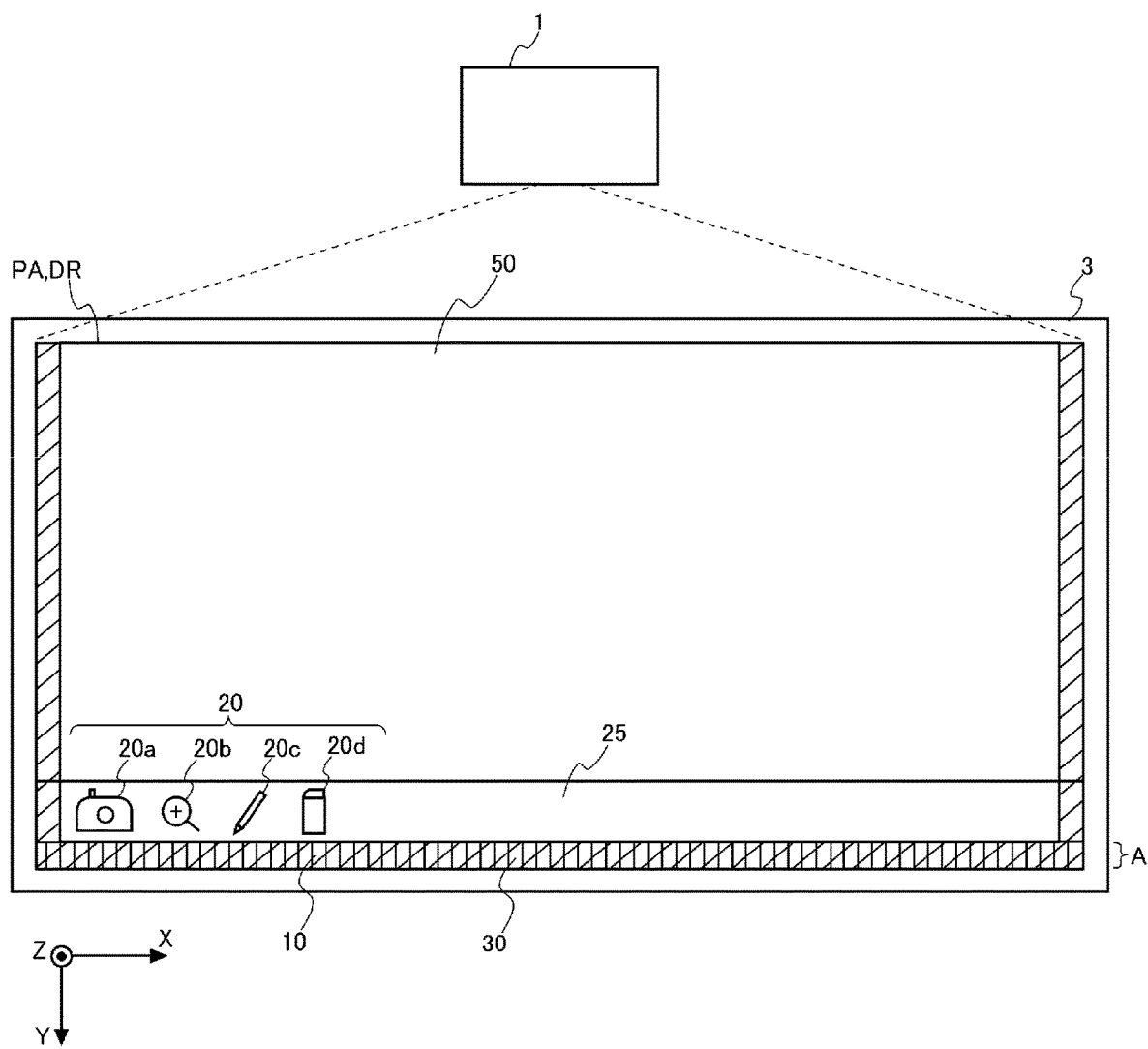
FIG. 6 shows an example of a display screen.
Figure 7:
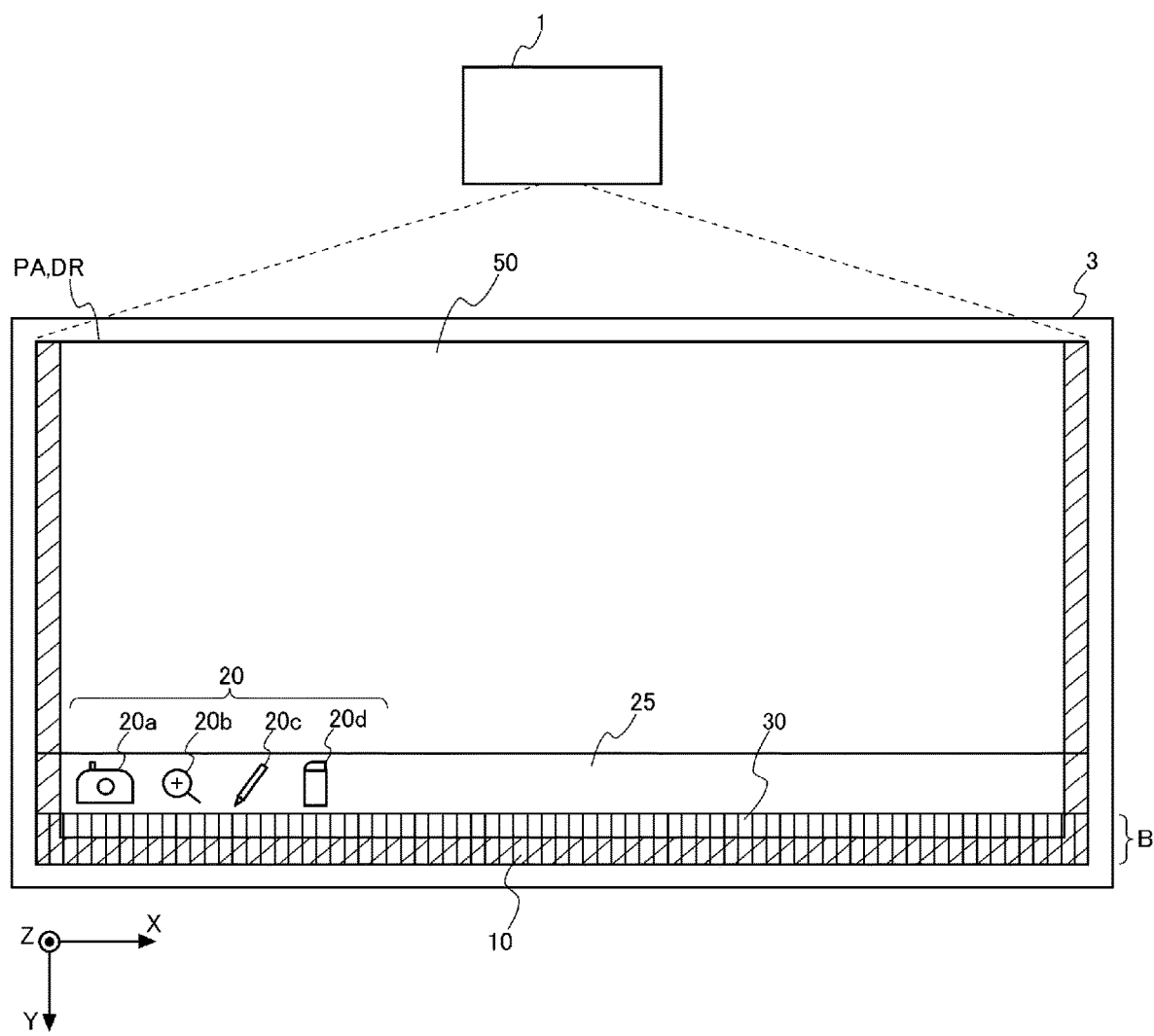
FIG. 7 shows another example of the display screen.

The position detector 183 detects the position at which the pointing element is pointing based on the result of the infrared light image detection. A position on a display screen 50 displayed in the projection region PA and a position in a captured image captured by the imager 150 are associated with each other by calibration performed in advance. That is, identification of a position in the captured image identifies the associated position on the display screen 50. The position detector 183 identifies the pointing position on the display screen 50 based on the position of the infrared light image detected from the captured image. The display screen 50 is a screen displayed on the projection surface 3 by the image light PL projected by the projector 1, as shown in FIGS. 6 and 7, which will be described later. Examples of the images displayed on the display screen 50 may include an image drawn by the touch operation performed by the pointing element on the projection surface 3, an image based on the image signal inputted via the input I/F 130, and an image based on image data stored in the memory 170 in advance.

In a captured image generated by the imager 150, the range over which the position detector 183 detects an infrared light image is called a detection range DR. The present embodiment will be described on the assumption that the detection range DR is so set as to coincide with the projection region PA. As a method for setting the detection range DR in such a way that the detection range DR coincides with the projection region PA, image light PL having an image pattern set in advance is projected on the projection surface 3, and the imager 150 captures an image of the projection surface 3. In the captured image generated by the imager 150, a range within which the image pattern has been captured can be set as the detection range DR.

The false detection evaluator 185 evaluates whether or not the state of the detection of an infrared light image detected by the position detector 183 is a specific state. Specifically, the false detection evaluator 185 regards the positions of infrared light images detected by the position detector 183 as temporarily set touch positions where the pointing element is in contact with or in the vicinity of the projection surface 3 and evaluates whether or not the detected and temporarily set touch positions are each a touch position falsely detected due, for example, to noise. The temporarily set touch positions are abbreviated to temporary touch positions. The false detection evaluator 185 determines, out of the temporary touch positions, a position that has not been determined by the false detection evaluator 185 based on the result of the evaluation to have been falsely detected to be the touch position where the touch operation has been performed. A state in which the position where the position detector 183 has detected an infrared light image is not the touch position where the touch operation has been performed corresponds to the specific state. The false detection evaluator 185 outputs the touch position where the touch operation has been performed to the display controller 189.

Figure 4:
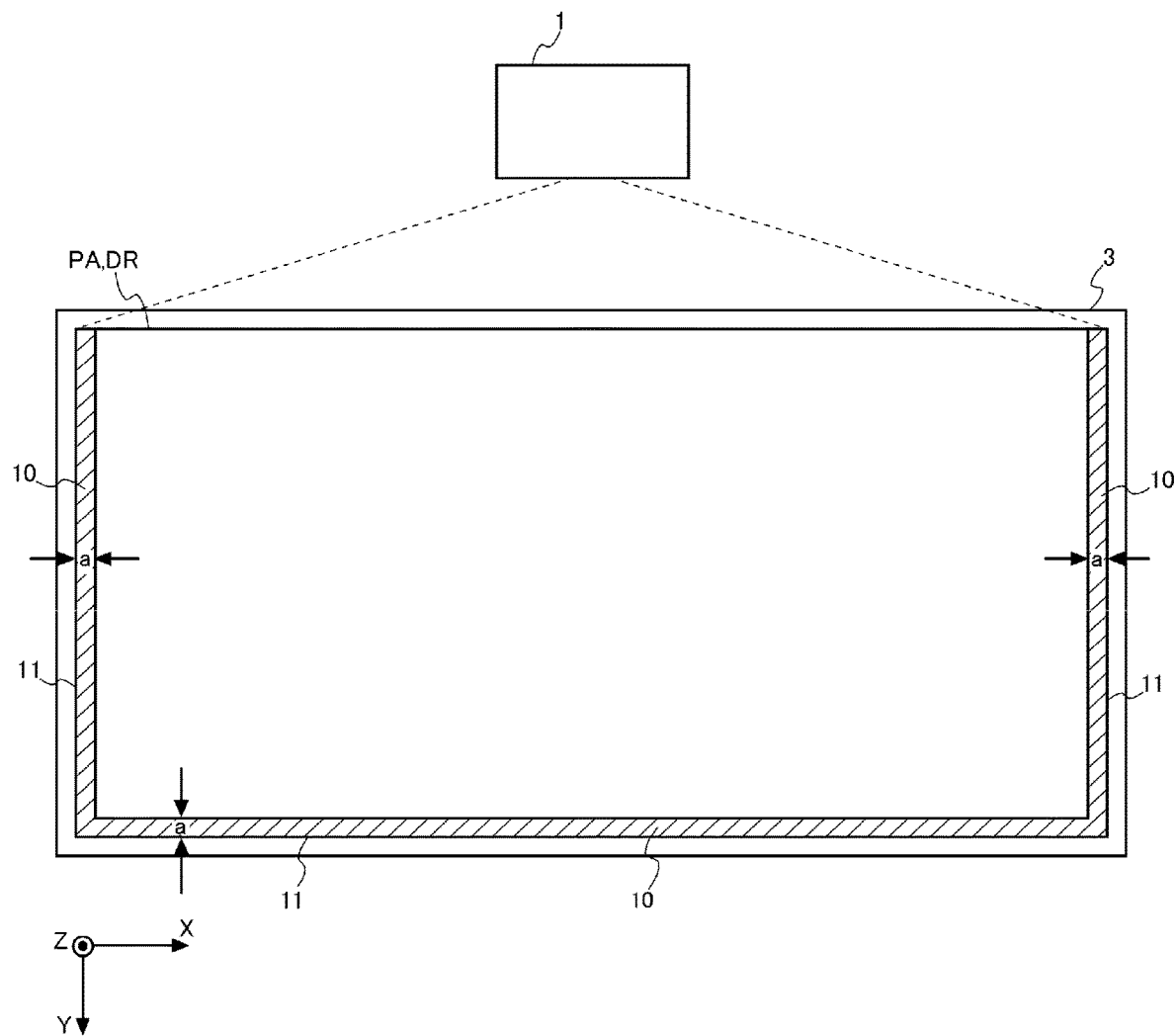
FIG. 4 shows an evaluation region.

FIG. 4 shows an evaluation region 10.

The evaluation region 10 is a preset region where false detection frequently occurs and over which the false detection evaluator 185 evaluates whether or not a temporary touch position has been falsely detected.

When the same or substantially the same position in the evaluation region 10 is detected as the temporary touch position multiple times that are greater than or equal to a preset number, the false detection evaluator 185 determines that the positions each detected as the temporary touch position have been falsely detected.

The evaluation region 10 is set at the lower end, the left end, and the right end of the projection region PA. The evaluation region 10 is so set as to extend by a predetermined width from a boundary 11 of the lower end, the left end, and the right end of the projection region PA inward into the projection region PA. FIG. 4 shows a case where the evaluation region 10 having a width "a" shown in FIG. 4 is set at the lower end, the left end, and the right end of the projection region PA, and the evaluation region 10 may instead have different widths at the lower end, the left end, and the right end of the projection region PA.

Figure 5:
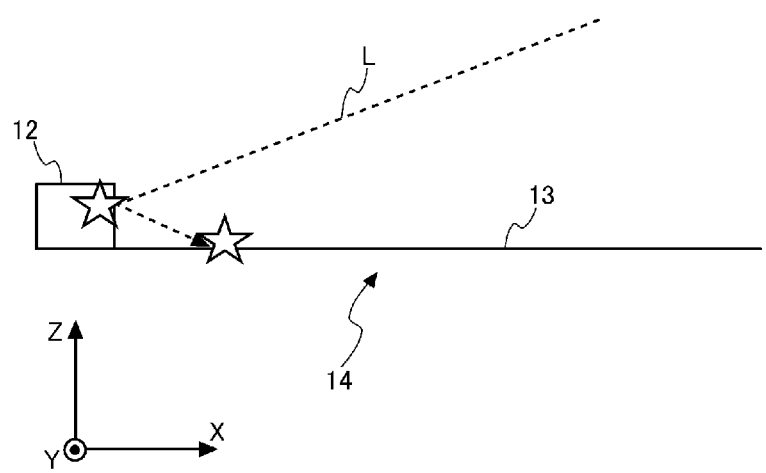
FIG. 5 shows a state in which a frame of a whiteboard is irradiated with detection light.

FIG. 5 shows a case where a whiteboard 14 is used as the projection surface 3 and a frame 12 of the whiteboard 14 is irradiated with the detection light L.

The frame 12 is provided at the end of the whiteboard 14 in some cases. When the frame 12 is irradiated with the detection light L, the detection light L reflected off the frame 12 is reflected off a board section 13 and other portions of the whiteboard 14, and the reflected light is falsely detected in some cases as the position where the touch operation has been performed. The board section 13 is a portion where a letter or any other information is written.

When the same or substantially the same position in the evaluation region 10 is detected as the temporary touch position multiple times that are greater than or equal to a preset number, the false detection evaluator 185 determines that the positions each detected as the temporary touch position have been falsely detected.

When an operator writes a letter with a hand of the operator pressed against the projection surface 3, vibration produced when the operator writes the letter is transmitted to the projection surface 3, and the projection surface 3 vibrates in some cases. When the projection surface 3 vibrates, the lower end and other portions of the projection surface 3 are irradiated with the detection light L, and the detection light L with which the projection surface 3 is irradiated is detected as the temporary touch position in some cases.

For example, when a temporary touch position is detected both in the evaluation region 10 and the detection range DR excluding the evaluation region 10, the false detection evaluator 185 determines that the temporary touch position detected in the evaluation region 10 has been falsely detected.

The detection light controller 187 controls the detection light radiation section 200.

The detection light controller 187 outputs a control signal to the laser light source unit 210 to switch the state of the detection light L between ON and OFF. For example, when the control signal inputted from the detection light controller 187 rises to a high signal level, the laser light source unit 210 radiates the detection light L, and when the control signal falls to a low signal level, the laser light source unit 210 stops radiating the detection light L.

The detection light controller 187 outputs a drive signal to the driver circuit 221 to control the operation of driving the motor 223. When the motor 223 is driven to cause the adjustment mechanism 225 to operate to adjust the radiation angle of the detection light L radiated by the laser light source unit 210, the radiation range of the detection light L is changed, so is the detection range DR, over which the touch operation is detected.

The display controller 189 controls the image processor 140 and the projection section 110 to cause them to project the image light PL on the projection surface 3 to display the display screen 50 in the projection region PA. Examples of the images displayed on the display screen 50 may include an image drawn by the touch operation performed by the pointing element, an image based on the image signal inputted via the input I/F 130, and an image based on image data stored in the memory 170 in advance.

A description will now be made of the action performed when the false detection evaluator 185 determines that a temporary touch position has been falsely detected.

The false detection evaluator 185, when it determines that a temporary touch position has been falsely detected, causes the detection light controller 187 to change the radiation angle of the detection light L. For example, assume that the frame 12, which is the end portion of the whiteboard 14, is irradiated with the detection light L at the lower end of the detection range DR, as shown in FIG. 2, and that the reflected detection light L causes false detection of a temporary touch position. In this case, the detection light controller 187 drives the driver circuit 221 to cause the motor 223 to perform the reverse rotation by one step. The radiation angle of the detection light L is thus so changed that the distance between the detection light L and the projection surface 3 increases. That is, a position beyond the projection surface 3, for example, the position T on the wall surface shown in FIG. 3 is irradiated with the detection light L. The false detection evaluator 185 and the detection light controller 187 repeat the process described above until the false detection of the touch operation does not occur. False detection of the touch operation can thus be avoided.

When the projector 1 is a model that does not include the adjuster 220 and cannot therefore adjust the radiation angle of the detection light L, the projector 1 edits an image to be projected on the projection surface 3. Specifically, a margin region 30 displayed on the display screen 50 is changed in terms of the size of the region to avoid false detection of the touch operation. The margin region 30 is a region where the projector 1 carries out no process even when the touch operation is detected in the margin region 30. That is, even when the touch operation is detected in the margin region 30, the projector 1 does not draw any letter or figure or select an icon 20 corresponding to the touch operation.

FIGS. 6 and 7 show examples of the display screen 50.

The projector 1 having the interactive function displays a GUI (graphical user interface) region 25 at the lower end of the display screen 50, which allows a process carried out by the projector 1 to be switched from one to another by the touch operation. A plurality of icons 20 are displayed in the GUI region 25. Examples of the icons 20 may include a camera icon 20*a*, an enlargement icon 20*b*, a pen icon 20*c*, and an eraser icon 20*d*.

The camera icon 20*a* is an icon for causing the projector 1 to generate captured images each showing a captured display screen 50 and save information on the display screen 50.

The enlargement icon 20*b* is an icon for causing the projector 1 to enlarge a figure, a letter, or an image displayed on the display screen 50.

The pen icon 20*c* is an icon for causing the projector 1 to draw a letter, a figure, or a picture on the projection surface 3.

The eraser icon 20d is an icon for causing the projector 1 to erase a letter or a figure drawn with the pen icon 20c.

The margin region 30 is provided below the GUI region 25. The false detection evaluator 185, when it determines that a temporary touch position has been falsely detected, causes the display controller 189 to change the region size of the margin region 30. Specifically, when the false detection evaluator 185 instructs a change in the region size of the margin region 30, the display controller 189 enlarges the margin region 30 in the vertical direction of the display screen 50. FIG. 6 shows a state before the size of the margin region 30 is changed, and FIG. 7 shows a state after the size of the margin region 30 is changed. The range hatched with vertical lines in FIGS. 6 and 7 corresponds to the margin region 30. The range hatched with oblique lines in FIGS. 6 and 7 corresponds to the evaluation region 10. The margin region 30 has a length A shown in FIG. 6 in the vertical direction of the display screen 50 before the size of the margin region 30 is changed, and the length of the margin region 30 in the vertical direction of the display screen 50 is changed to a length B shown in FIG. 7 after the size of the margin region 30 is changed. The length B is longer than the length A, and FIGS. 6 and 7 show that the size of the margin region 30 has been increased in the vertical direction of the display screen 50.

The margin region 30 is a region where no image, such as icons, is displayed and no operation is accepted. Even when a temporary touch position is detected in the margin region 30, the projector 1 does not recognize the detected temporary touch position as the touch operation. The problem of input of accidental operation can therefore be solved.

Further, when no GUI region 25 is displayed on the display screen 50, the false detection evaluator 185 adjusts at least one of the position and the size of the projection region PA on the projection surface 3. For example, the false detection evaluator 185 instructs the display controller 187 to reduce the projection region PA. Reducing the projection region PA changes the position and size of the projection region PA and in turn the position of the evaluation region 10 is changed. The position of the projection region PA on the projection surface 3 may instead be changed to solve the problem of false detection of a temporary touch position.

Figure 8:
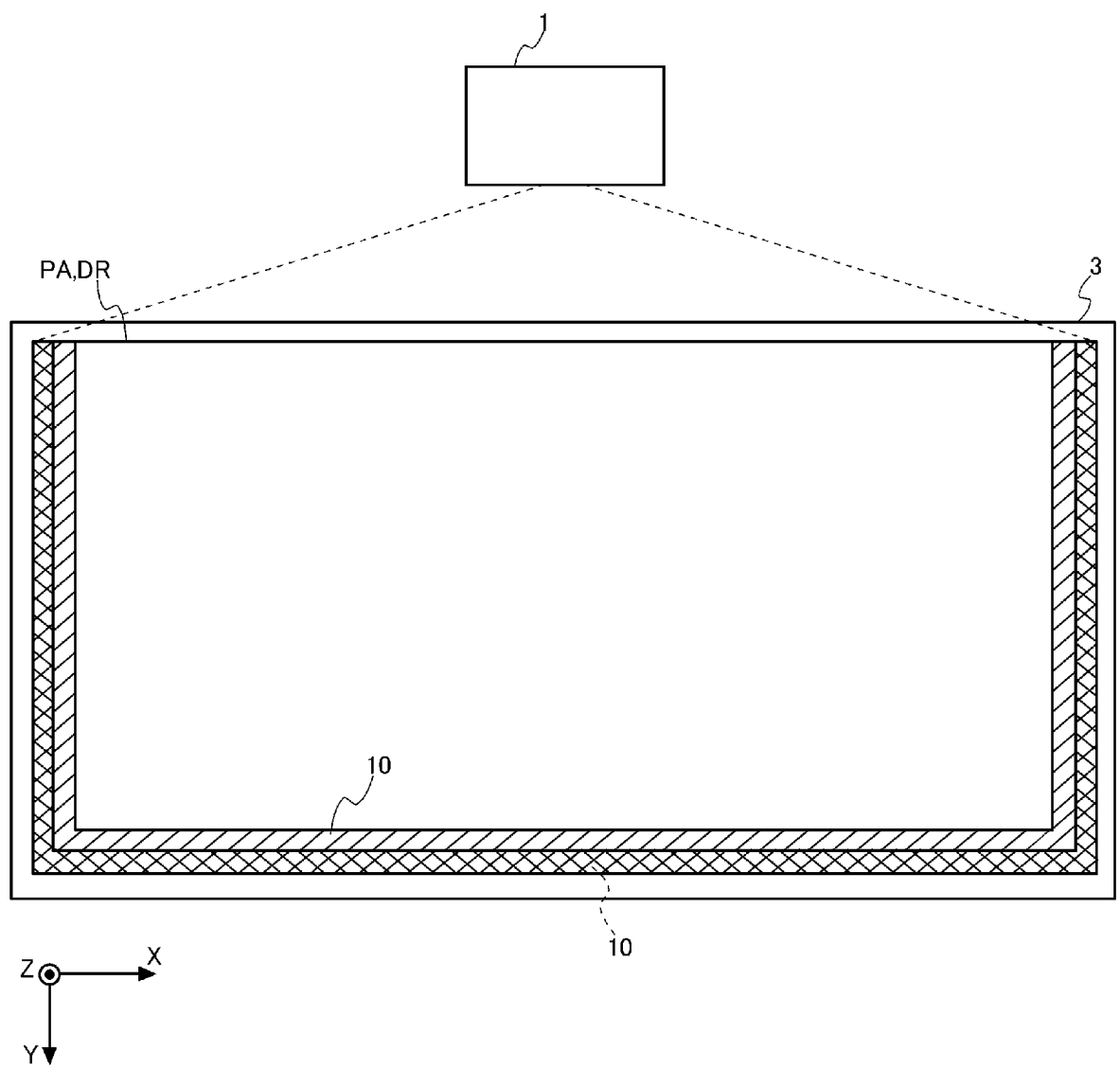
FIG. 8 shows the position of the evaluation region before and after the size of a projection region is changed.

FIG. 8 shows the position of the evaluation region 10 before and after the size of the projection region PA is reduced.

The display controller 189 keeps the position of the upper end of the display screen 50 unchanged before and after the size of the projection region PA is reduced. That is, reducing the size of the projection region PA causes the display screen 50 and the evaluation region 10 to move upward with respect to the projection surface 3, that is, toward the installed projector 1. When the lower end of the display screen 50 is moved upward with respect to the projection surface 3, the evaluation region 10 also moves upward with respect to the projection surface 3 as the display screen 50 moves. FIG. 8 shows the position of the evaluation region 10 before the size of the projection region PA is reduced in the form of the cross-hatched portion hatched with oblique lines extending in two different directions. FIG. 8 further shows the position of the evaluation region 10 after the size of the projection region PA is reduced in the form of the portion hatched with an oblique line extending in one direction. Moving the position of the evaluation region 10 upward with respect to the projection surface 3 causes the frame 12 provided at the lower end of the projection surface and other portions to be irradiated with the detection light L, whereby the problem of false detection of a temporary touch position can be solved.

Figure 9:
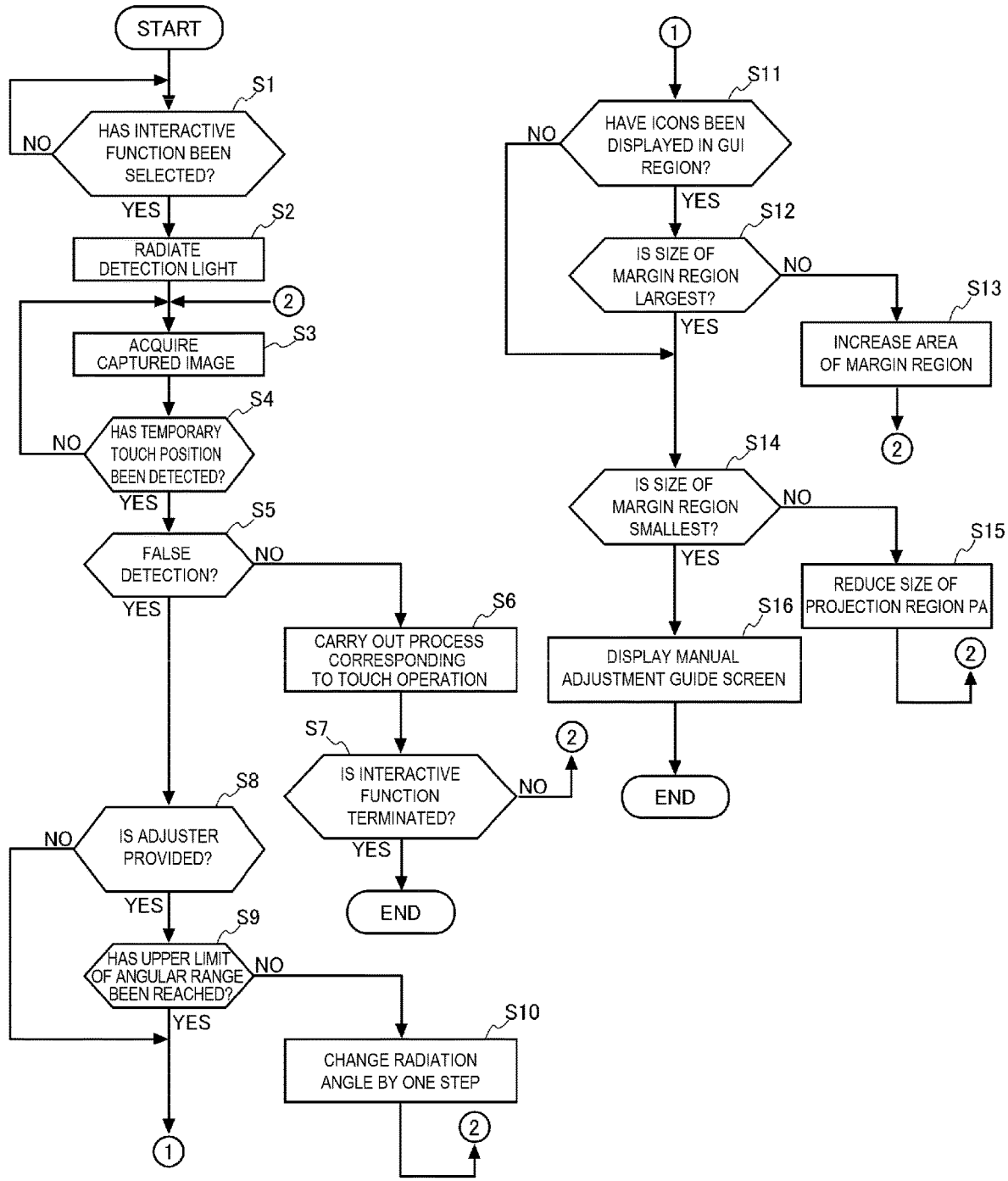
FIG. 9 is a flowchart showing the action of the projector.

FIG. 9 is a flowchart showing the action of the projector 1.

The action of the projector 1 will be described with reference to the flowchart shown in FIG. 9.

The controller 160 first evaluates whether or not the remote control has accepted the operation of selecting the interactive function (step S1). When the remote control has not accepted the operation of selecting the interactive function (NO in step S1), the controller 160 waits for the start of a process until the remote control accepts the operation of selecting the interactive function.

When the remote control has accepted the operation of selecting the interactive function (YES in step S1), the controller 160 causes the detection light radiation section 200 to start radiating the detection light L (step S2). The controller 160 then causes the imager 150 to perform the imaging to acquire a captured image (step S3).

The controller 160 analyzes the acquired captured image to detect an image of the reflected light that is the detection light L reflected off the pointing element to detect a temporary touch position (step S4). When no image of the reflected light has been detected from the captured image and no temporary touch position has therefore been detected (NO in step S4), the controller 160 returns to step S3, where the controller 160 acquires a next captured image and detects an image of the reflected light.

When a temporary touch position has been detected (YES in step S4), the controller 160 evaluates whether or not the detected temporary touch position has been falsely detected (step S5).

For example, when the same or substantially the same position in the evaluation region 10 is detected as the touch operation position multiple times that are greater than or equal to a preset number, the controller 160 determines that the temporary touch positions detected multiple times have been falsely detected.

When the detected temporary touch position has not been falsely detected (NO in step S5), the controller 160 determines that the temporary touch position is the touch position where the touch operation has been performed and carries out a process corresponding to the touch operation (step S6). For example, the controller 160 carries out a process corresponding to the icon 20 selected by the touch operation. The controller 160 then evaluates whether or not the operation of terminating the interactive function has been accepted (step S7). When the operation of terminating the interactive function has been accepted (YES in step S7), the controller 160 terminates the procedure shown in the flowchart. When the operation of terminating the interactive function has not been accepted (NO in step S7), the controller 160 returns to the process in step S3, where the controller 160 detects a temporary touch position from a captured image again.

When the detected temporary touch position has been falsely detected (YES in step S5), the controller 160 evaluates whether or not the detection light radiation section 200 includes the adjuster 220, which can change the radiation angle of the detection light L (step S8). When the detection light radiation section 200 does not include the adjuster 220 (NO in step S8), the controller 160 transitions to the evaluation in step S11.

When the detection light radiation section 200 includes the adjuster 220 (YES in step S8), the controller 160 evaluates whether or not the radiation angle of the detection light L is the upper limit of a changeable angular range (step S9). When the radiation angle of the detection light L is the upper limit of the angular range (YES in step S9), the controller 160 transitions to the evaluation in step S11. When the radiation angle of the detection light L is not the upper limit of the angular range (NO in step S9), the controller 160 causes the driver circuit 221 to drive the motor 223 by one step to change the radiation angle by an angle corresponding to one step (step S10). The controller 160 then returns to the process in step S3, where the controller 160 detects a temporary touch position from a captured image again.

When the result of the evaluation in step S8 is negative or when the result of the evaluation in step S9 is affirmative, the controller 160 evaluates whether or not the icons 20 have been displayed in the GUI region 25 (step S11). When the icons 20 have not been displayed in the GUI region 25 (NO in step S11), the controller 160 transitions to the evaluation in step S14.

When the icons 20 have been displayed in the GUI region 25 (YES in step S11), the controller 160 evaluates whether or not the region size of the margin region 30 is the largest settable size (step S12). When the region size of the margin region 30 is the largest settable size (YES in step S12), the controller 160 transitions to the evaluation in step S14. When the region size of the margin region 30 is not the largest (NO in step S12), the controller 160 edits the display screen 50 to increase the area of the margin region 30 by a preset amount (step S13).

When the result of the evaluation in step S11 is negative (NO in step S11) or when the result of the evaluation in step S12 is affirmative (YES in step S12), the controller 160 transitions to the evaluation in step S14. The controller 160 evaluates whether or not the size of the projection region PA is the smallest settable size (step S14). When the size of the projection region PA is not the smallest size (NO in step S14), the controller 160 reduces the size of the projection region PA by one size set in advance (Step S15). The controller 160 then returns to the process in step S3, where the controller 160 detects a temporary touch position from a captured image again.

When the size of the projection region PA is the smallest settable size (YES in step S14), the controller 160 causes the display controller 189 to display a manual adjustment guide screen that allows the user to manually adjust the detection light radiation section 200 on the projection surface 3 (step S16) and terminates the process procedure.

In the flowchart described above, when the projector 1 does not include the adjuster 220, or when the radiation angle of the detection light L is the upper limit of the angular range, the projector 1 evaluates whether or not the size of the margin region 30 is adjustable, and when the size of the margin region 30 is adjustable, the projector 1 adjusts the size of the margin region 30. As a variation, when the projector 1 does not include the adjuster 220, or when the radiation angle of the detection light L is the upper limit of the angular range, the projector 1 may evaluate whether or not the size of the projection region PA is adjustable. When the size of the projection region PA is adjustable, the projector 1 performs the adjustment in such a way that the size of the projection region PA is reduced. Further, when a temporary touch position is falsely detected even after the size of the projection region PA is adjusted, the size of the margin region 30 may be adjusted.

In the flowchart described above, after the size of the margin region 30 is adjusted, or when the size of the margin region 30 is not adjustable, the size of the projection region PA is adjusted. Instead, the size of the margin region 30 and the size of the projection region PA may both be adjusted to avoid false detection of a temporary touch position.

As described above, the projector 1 according to the present embodiment includes the projection section 110, the laser light source unit 210, the adjuster 220, the imager 150, and the controller 160.

The projection section 110 projects an image on the projection surface 3.

The laser light source unit 210 radiates the detection light L in the direction corresponding to the projection surface 3.

The adjuster 220 adjusts the direction of the detection light L with respect to the projection surface 3.

The controller 160 includes the position detector 183, the false detection evaluator 185, and the detection light controller 187. The position detector 183 detects the reflected detection light L from a captured image captured by the imager 150 to detect the touch operation performed on the projection surface 3. The false detection evaluator 185 evaluates whether or not the state of the detection of the reflected light corresponds to the specific state. When the false detection evaluator 185 determines that the state of the detection of the reflected light corresponds to the specific state, the detection light controller 187 controls the adjuster 220 to cause it to adjust the direction of the detection light L.

For example, false detection of the touch operation can be avoided by causing the false detection evaluator 185 to determine that the case where the detection of the reflected detection light L does not result in detection of the touch operation corresponds to the specific state and causing the adjuster 220 to adjust the direction of the detection light L.

The laser light source unit 210 radiates the detection light L in the direction along the projection surface 3.

The position detector 183 detects the reflected light reflected off the pointing element in contact with or in the vicinity of the projection surface 3. When the false detection evaluator 185 determines that the state of the detection of the reflected light corresponds to the specific state, the detection light controller 187 controls the adjuster 220 to cause it to adjust the angle between the projection surface 3 and the detection light L.

Since the angle between the projection surface 3 and the detection light L is adjusted, the direction of the detection light L radiated in the direction along the projection surface 3 is changed, whereby false detection of the touch operation can be avoided.

The controller 160 includes the display controller 189.

When the false detection evaluator 185 determines that the state of the detection of the reflected light corresponds to the specific state even after the detection light controller 187 adjusts the angle between the projection surface 3 and the detection light L, the display controller 189 adjusts the image projection range on the projection surface 3.

Therefore, when the state of the detection of the reflected light is not improved even after the angle between the projection surface 3 and the detection light L is adjusted, the image projection range on the projection surface 3 can be adjusted to avoid false detection of the touch operation.

When the false detection evaluator 185 determines that the state of the detection of the reflected light corresponds to the specific state even after the projection region PA, which is the image projection range on the projection surface 3, is adjusted, the display controller 189 edits an image to be projected on the projection surface 3.

Therefore, when the state of the detection of the reflected light is not improved even after the projection region PA is adjusted, an image to be projected on the projection surface 3 can be edited to avoid false detection of the touch operation.

The display controller 189 adjusts at least one of the position and the size of the projection region PA to adjust the projection region PA.

The projection region PA, which is the image projection range, is therefore readily adjusted.

The controller 160, when it determines that the direction of the detection light L is not adjustable, adjusts at least one of the position and the size of the image projection range on the projection surface 3.

Since at least one of the position and the size of the image projection range is therefore adjusted, the reflected light may be detected within the range corresponding to the adjusted projection range. False detection of the touch operation can therefore be avoided.

The controller 160, when it determines that the direction of the detection light L is not adjustable, edits an image to be displayed on the projection surface 3.

For example, the controller 160 edits an image to be displayed on the projection surface 3 and displays an image that does not correspond to the touch operation. Even when the reflected light is detected in a region of a captured image that is the region corresponding to the image that does not correspond to the touch operation, the controller 160 does not determine that the touch operation has been detected, whereby false detection of the touch operation can be avoided.

The embodiment described above is a preferable embodiment of the present disclosure. The present disclosure is, however, not limited to the embodiment described above, and a variety of changes can be made thereto to the extent that the changes do not depart from the substance of the present disclosure.

For example, the functional portions of the projector 1 shown in FIG. 1 each represent a functional configuration and are not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions of the projector can be arbitrarily changed to the extent that the change does not depart from the substance of the present disclosure.

The process units in the flowchart shown in FIG. 9 are process units divided in accordance with the contents of the primary processes for easy understanding of the processes carried out by the projector 1. How to produce the divided process units or the names of the process units shown in the flowchart of FIG. 9 do not limit the present disclosure. A process carried out by the controller 160 can be further divided into a larger number of process units in accordance with the content of the process, and the process units can each further be divided into a large number of processes. Further, the order in accordance with which the processes are carried out in the flowchart described above is not limited to that shown in FIG. 9.

When the method for controlling the projector 1 is achieved by using a computer provided in the projector 1, a program executed by the computer can be configured in the form of a recording medium or a transmission medium that transmits the program. The recording medium can be a magnetic or optical recording medium or a semiconductor memory device. Specific examples of the recording medium may include a flexible disk, an HDD (hard disk drive), a CD-ROM, a DVD, a Blu-ray Disc, a magneto-optical disk, a flash memory, and a portable recording medium, such as a card-shaped recording medium or a fixed recording medium. The recording medium described above may instead be a RAM, a ROM, an HDD, or any other nonvolatile storage device that is an internal storage device provided in a server apparatus. Blu-ray is a registered trademark.

What is claimed is:

1. A projector comprising:
   a projection section that projects an image on a projection surface;
   a detection light radiation section that radiates detection light in a direction corresponding to the projection surface;
   an adjuster that adjusts the direction of the detection light with respect to the projection surface;
   a detector that detects reflected light resulting from the detection light to detect operation performed on the projection surface; and
   a controller that evaluates whether or not a state of the detection of the reflected light corresponds to a specific state and causes the adjuster to adjust the direction of the detection light based on a result of the evaluation, the specific state being a state in which a position of the reflection light is incorrectly determined to be a touch position.

2. The projector according to claim 1, wherein the detection light radiation section radiates the detection light in a direction along the projection surface, the detector detects the reflected light reflected off a pointing element in contact with or in a vicinity of the projection surface, and when the controller determines that the state of the detection of the reflected light corresponds to the specific state, the controller controls the adjuster to adjust an angle between the projection surface and the detection light.

3. The projector according to claim 2, wherein when the controller determines that the state of the detection of the reflected light corresponds to the specific state even after the angle between the projection surface and the detection light is adjusted, the controller adjusts an image projection range on the projection surface.

4. The projector according to claim 3, wherein when the controller determines that the state of the detection of the reflected light corresponds to the specific state even after the image projection range on the projection surface is adjusted, the controller edits an image to be projected on the projection surface.

5. The projector according to claim 3, wherein the controller adjusts at least one of a position and a size of the projection range to adjust the projection range.

6. The projector according to claim 1, wherein when the controller determines that the state of the detection of the reflected light corresponds to the specific state, the controller evaluates whether or not the direction of the detection light with respect to the projection surface is adjustable, and when the controller determines that the direction of the detection light is not adjustable, the controller adjusts an image projection range on the projection surface.

7. The projector according to claim 1, wherein when the controller determines that the state of the detection of the reflected light corresponds to the specific state, the controller evaluates whether or not the direction of the detection light with respect to the projection surface is adjustable, and when the controller determines that the direction of the detection light is not adjustable, the controller adjusts at least one of a position and a size of an image projection range on the projection surface.

8. The projector according to claim 6, wherein when the controller determines that the direction of the detection light is not adjustable, the controller edits an image to be projected on the projection surface.

9. A method for controlling a projector, the method comprising:
radiating detection light in a direction corresponding to a projection surface onto which an image is projected;
detecting reflected light resulting from the detection light to detect operation performed on the projection surface;
evaluating whether or not a state of the detection of the reflected light corresponds to a specific state; and
adjusting the direction of the detection light with respect to the projection surface based on a result of the evaluation, the specific state being a state in which a position of the reflection light is incorrectly determined to be a touch position.

10. The method for controlling a projector according to claim 9, wherein the detection light is radiated in a direction along the projection surface; the reflected light reflected off a pointing element in contact with or in a vicinity of the projection surface is detected; and when it is determined that the state of the detection of the reflected light corresponds to the specific state, an angle between the projection surface and the detection light is adjusted.

11. The method for controlling a projector according to claim 10, wherein when it is determined that the state of the detection of the reflected light corresponds to the specific state even after the angle between the projection surface and the detection light is adjusted, an image projection range on the projection surface is adjusted.

12. The method for controlling a projector according to claim 11, wherein when it is determined that the state of the detection of the reflected light corresponds to the specific state even after the image projection range on the projection surface is adjusted, an image to be projected on the projection surface is edited.

13. The method for controlling a projector according to claim 11, wherein at least one of a position and a size of the projection range is adjusted to adjust the projection range.

14. The method for controlling a projector according to claim 9, wherein when it is determined that the state of the detection of the reflected light corresponds to the specific state, it is evaluated whether or not the direction of the detection light with respect to the projection surface is adjustable, and when it is determined that the direction of the detection light is not adjustable, an image projection range on the projection surface is adjusted.

15. The method for controlling a projector according to claim 14, wherein when it is determined that the direction of the detection light is not adjustable, an image to be projected on the projection surface is edited.

16. The method for controlling a projector according to claim 9, wherein when it is determined that the state of the detection of the reflected light corresponds to the specific state, it is evaluated whether or not the direction of the detection light with respect to the projection surface is adjustable, and when it is determined that the direction of the detection light is not adjustable, at least one of a position and a size of an image projection range on the projection surface is adjusted.

* * * * *